United States Patent
Nian et al.

(10) Patent No.: US 9,453,667 B2
(45) Date of Patent: Sep. 27, 2016

(54) HEAT PUMP AIR-CONDITIONING SYSTEM AND METHOD FOR CONTROLLING THE SAME

(71) Applicant: INDUSTRIAL TECHNOLOGY RESEARCH INSTITUTE, Hsin-Chu (TW)

(72) Inventors: Shy-Her Nian, Changhua County (TW); Ling-Yu Chao, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 661 days.

(21) Appl. No.: 13/727,399

(22) Filed: Dec. 26, 2012

(65) Prior Publication Data

US 2013/0118193 A1    May 16, 2013

(30) Foreign Application Priority Data

Nov. 16, 2012    (TW) .............................. 101142994 A (51) Int. Cl.
*F25B 27/00*    (2006.01)
*F25B 13/00*    (2006.01)
(Continued)

(52) U.S. Cl.
CPC ................. *F25B 41/04* (2013.01); *F24D 5/12* (2013.01); *F24D 17/02* (2013.01); *F25B 13/00* (2013.01);
(Continued)

(58) Field of Classification Search
CPC .. F24D 17/02; F24D 5/12; F24F 2011/0064; F25B 13/00; F25B 2313/02323; F25B 2313/02741; F25B 2400/0411; F25B 41/04

USPC ........................ 62/238.6, 238.7, 324.1, 324.6
See application file for complete search history.

(56) References Cited

U.S. PATENT DOCUMENTS 4,399,664 A    8/1983    Derosier
4,493,193 A *  1/1985    Fisher ................. F24D 11/0214
                                                         62/160

(Continued)

FOREIGN PATENT DOCUMENTS

CN             2757042 Y       2/2006
CN           101329156 A      12/2008
(Continued)

OTHER PUBLICATIONS

"Performance of Multi-functional Domestic Heat Pump System" by Jie Ji et. al., Elsevier Publishing, 2005.*

(Continued)

*Primary Examiner* — Henry Crenshaw
(74) *Attorney, Agent, or Firm* — Rabin & Berdo, P.C.

(57) ABSTRACT

A heat pump air-conditioning system includes a four-way valve provided with a first opening, a second opening, a third opening and a fourth opening communicated with each other. The first opening, a compressor, a first heat exchanger, a first expansion device and the second opening are sequentially connected in series. The third opening, a second heat exchanger, a second expansion device, a third heat exchanger and the fourth opening are sequentially connected in series. A first bypass valve is connected in parallel with the first expansion device and is connected between the first heat exchanger and the second opening. A second bypass valve is connected in parallel with the second expansion device and the third heat exchanger and is connected between the third heat exchanger and the fourth opening. A liquid supply system is connected to the first heat exchanger.

24 Claims, 7 Drawing Sheets

(51) Int. Cl.
*F25B 41/04* (2006.01)
*F24D 17/02* (2006.01)
*F24D 5/12* (2006.01)
F25B 40/04 (2006.01)
F24F 11/00 (2006.01)

(52) U.S. Cl.
CPC ........ *F24F 2011/0064* (2013.01); *F25B 40/04* (2013.01); *F25B 2313/02323* (2013.01); *F25B 2313/02741* (2013.01); *F25B 2339/047* (2013.01); *F25B 2341/0662* (2013.01); *F25B 2400/0411* (2013.01)

(56) References Cited

U.S. PATENT DOCUMENTS

| | | | |
|---|---|---|---|
| 4,955,207 A | 9/1990 | Mink | |
| 5,368,425 A | 11/1994 | Mills et al. | |
| 7,883,024 B2* | 2/2011 | Nakayama | F24D 19/1039 237/19 |
| 2005/0104185 A1* | 5/2005 | Shimogishi | F25B 21/00 257/686 |
| 2005/0164207 A1 | 7/2005 | Shapero | |
| 2008/0190130 A1* | 8/2008 | Murakami | F25B 13/00 62/324.3 |
| 2008/0196431 A1* | 8/2008 | Goransson | F24D 3/18 62/238.6 |
| 2008/0197206 A1* | 8/2008 | Murakami | F25B 13/00 237/2 B |
| 2008/0230620 A1* | 9/2008 | Ida | F24D 19/1054 237/2 A |
| 2008/0296396 A1* | 12/2008 | Corroy | F25B 6/02 237/2 B |
| 2009/0049857 A1* | 2/2009 | Murakami | F25B 13/00 62/324.6 |
| 2009/0113911 A1* | 5/2009 | Nakayama | F24D 17/02 62/238.6 |
| 2009/0125150 A1* | 5/2009 | Lifson | F24D 12/02 700/278 |
| 2009/0126371 A1* | 5/2009 | Powell | F25B 9/00 62/6 |
| 2010/0106334 A1* | 4/2010 | Grohman | F24F 11/006 700/278 |
| 2010/0300135 A1* | 12/2010 | Otake | F24D 17/02 62/335 |
| 2011/0197600 A1* | 8/2011 | Hamada | F24H 4/04 62/79 |
| 2011/0283726 A1* | 11/2011 | Sim | F24D 3/18 62/160 |

FOREIGN PATENT DOCUMENTS

| | | |
|---|---|---|
| JP | S5298347 A | 8/1977 |
| JP | 2008032376 A | 2/2008 |
| TW | 355053 | 3/1999 |
| TW | 200925533 A | 6/2009 |
| TW | M410204 U | 8/2011 |
| TW | 201219726 A | 5/2012 |
| TW | M434916 | 8/2012 |

OTHER PUBLICATIONS

Fehrm et al., "Exhaust air heat recovery in buildings", International Journal of Ref rigeration vol. 25, pp. 439-449, 2002.

Gong et al., "A new heat recovery technique for air-conditioning/heat-pump system", Applied Thermal Engineering, vol. 28, pp. 2360-2370, 2008.

Riffa et al., "Performance of a novel mechanical ventilation heat recovery heat pump system", Applied Thermal Engineering, vol. 22, pp. 839-845, 2002.

Guo et al., "Experimental research and operation optimization of an air-source heat pump water heater", Applied Energy, vol. 88, pp. 4128-4138, 2011.

Ji et al., "Performance of multi-functional domestic heat-pump system", Applied Energy, vol. 80, pp. 307-326, 2005.

Taiwan Patent Office, Office Action, Patent Application Serial No. TW101142994, Mar. 6, 2015, Taiwan.

China Patent Office, Office Action, patent application No. 201310013773.9, Nov. 23, 2015.

* cited by examiner

HEAT PUMP AIR-CONDITIONING SYSTEM AND METHOD FOR CONTROLLING THE SAME

CROSS-REFERENCE TO RELATED APPLICATIONS

This non-provisional application claims priority under 35 U.S.C. §119(a) on Patent Application No(s). 101142994 filed in Taiwan, R.O.C. on Nov. 16, 2012, the entire contents of which are hereby incorporated by reference.

BACKGROUND

1. Technical Field

The disclosure relates to a heat pump air-conditioning system and a method for controlling the same, and more particularly to a heat pump air-conditioning system and a method for controlling the same capable of changing the flow direction of a refrigerant to perform different heat exchange modes.

2. Related Art

Hot water, cool air and warm air have already become indispensable parts of people's daily life. For most people, hot water is provided by a heat pump device, and cool air and warm air are provided by an air-conditioner.

The heat pump device comprises a heating device and a water supply device. The water supply device provides water to the heating device, and the heating device heats the water to a particular temperature for use.

The air-conditioner at least comprises a compressor, an expansion valve, an evaporator, a condenser, a heat dissipation device and a fan. A refrigerant carries out heat exchange in the evaporator and the condenser, and provides cool air or warm air through the fan.

In view of the above, the air-conditioner and heat pump device are separate devices and are respectively limited in use or price. Therefore, some manufacturers have developed a composite heat pump air-conditioning system having the functions of both the air-conditioner and the heat pump. Specifically, the composite heat pump air-conditioning system has a three-way control valve and an electronic expansion valve, so as to operate as the heat pump or provide the cool air and the warm air by changing the flow direction of the refrigerant.

However, in the operation process of the composite heat pump air-conditioning system, when the vapor refrigerant passes through the electronic expansion valve, an excessive pressure drop or over-expansion may occurs, and therefore, the coefficient of performance (C.O.P) of the system is lowered.

SUMMARY

The heat pump air-conditioning system provided by the disclosure comprises a refrigerant circulation system, a first bypass valve, a second bypass valve and a liquid supply system. The refrigerant circulation system comprises a four-way valve, a compressor, a first heat exchanger, a second heat exchanger, a third heat exchanger, a first expansion device and a second expansion device. The four-way valve comprises a first opening, a second opening, a third opening and a fourth opening communicated with each other. The first opening, the compressor, the first heat exchanger, the first expansion device and the second opening are sequentially connected in series. The third opening, the second heat exchanger, the second expansion device, the third heat exchanger and the fourth opening are sequentially connected in series. The first bypass valve is connected in parallel with the first expansion device and is connected between the first heat exchanger and the second opening. The second bypass valve is connected in parallel with the second expansion device and the third heat exchanger and is connected between the third heat exchanger and the fourth opening. The liquid supply system is connected to the first heat exchanger.

The method for controlling a heat pump air-conditioning system provided by the disclosure comprises: providing the heat pump air-conditioning system; turning off the liquid supply system, the first expansion device and the second bypass valve; and enabling the refrigerant to flow from the compressor sequentially through the first heat exchanger, the first bypass valve, the four-way valve, the second heat exchanger, and the second expansion device to the third heat exchanger, and then flow from the third heat exchanger through the four-way valve back to the compressor, the refrigerant releasing heat at the second heat exchanger and absorbing heat at the third heat exchanger.

The method for controlling a heat pump air-conditioning system provided by the disclosure comprises: providing the heat pump air-conditioning system; turning off the liquid supply system, the first expansion device and the second bypass valve; and enabling the refrigerant to flow from the compressor sequentially through the first heat exchanger, the first bypass valve, the four-way valve, the third heat exchanger, and the second expansion device to the second heat exchanger, and then flow from the second heat exchanger through the four-way valve back to the compressor, the refrigerant absorbing heat at the second heat exchanger and releasing heat at the third heat exchanger.

The method for controlling a heat pump air-conditioning system provided by the disclosure comprises: providing the heat pump air-conditioning system; turning off the first bypass valve and the second expansion device; and enabling the refrigerant to flow from the compressor sequentially through the first heat exchanger, the first expansion device, the four-way valve, and the second bypass valve to the second heat exchanger, and then flow from the second heat exchanger through the four-way valve back to the compressor, the liquid supply system absorbing heat of the refrigerant from the first heat exchanger, and the refrigerant absorbing heat at the second heat exchanger.

The method for controlling a heat pump air-conditioning system provided by the disclosure comprises: providing the heat pump air-conditioning system; turning off the first expansion device and the second bypass valve; and enabling the refrigerant to flow from the compressor sequentially through the first heat exchanger, the first bypass valve, the four-way valve, the second heat exchanger, and the second expansion device to the third heat exchanger, and then flow from the third heat exchanger through the four-way valve back to the compressor, the liquid supply system absorbing heat of the refrigerant from the first heat exchanger, and the refrigerant releasing heat at the second heat exchanger and absorbing heat at the third heat exchanger.

The method for controlling a heat pump air-conditioning system provided by the disclosure comprises: providing the heat pump air-conditioning system; turning off the first expansion device and the second bypass valve; and enabling the refrigerant to flow from the compressor sequentially through the first heat exchanger, the first bypass valve, the four-way valve, the third heat exchanger, and the second expansion device to the second heat exchanger, and then flow from the second heat exchanger through the four-way valve back to the compressor, the liquid supply system absorbing heat of the refrigerant from the first heat exchanger, and the refrigerant absorbing heat at the second heat exchanger and releasing heat at the third heat exchanger.

The method for controlling a heat pump air-conditioning system provided by the disclosure comprises: providing the heat pump air-conditioning system; turning off the first bypass valve and the second bypass valve; and enabling the refrigerant to flow from the compressor sequentially through the first heat exchanger, the first expansion device, the four-way valve, the third heat exchanger, and the second expansion device to the second heat exchanger, and then flow from the second heat exchanger through the four-way valve back to the compressor, the liquid supply system absorbing heat of the refrigerant from the first heat exchanger, and the refrigerant absorbing heat at the second heat exchanger and the third heat exchanger.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
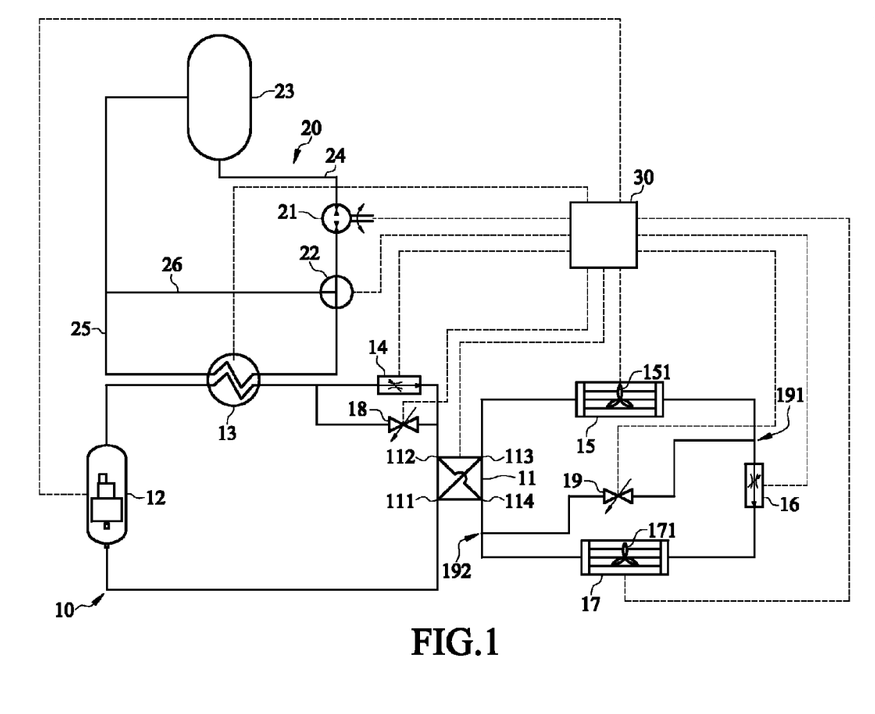
FIG. 1 is a structural view of a heat pump air-conditioning system according to an embodiment of the disclosure.

FIG. 1 is a structural view of a heat pump air-conditioning system according to an embodiment of the disclosure.

The heat pump air-conditioning system 1 of this embodiment comprises a refrigerant circulation system 10, a first bypass valve 18, a second bypass valve 19 and a liquid supply system 20. In addition, the heat pump air-conditioning system 1 of this embodiment further comprises a first three-way pipe 191 and a second three-way pipe 192. The refrigerant circulation system 10 is provided for circulation of a refrigerant. The refrigerant circulation system 10 comprises a four-way valve 11, a compressor 12, a first heat exchanger 13, a second heat exchanger 15, a third heat exchanger 17, a first expansion device 14 and a second expansion device 16. In this and some other embodiments, the first heat exchanger 13 is a liquid heat exchanger, that is, the refrigerant in the first heat exchanger 13 exchanges heat with a liquid (for example, water). In this and some other embodiments, the second heat exchanger 15 is a gas heat exchanger disposed outdoors and comprises an outdoor fan 151, that is, the refrigerant in the second heat exchanger 15 exchanges heat with a gaseous fluid (for example, an airflow produced by the operation of the outdoor fan 151). In this and some other embodiments, the third heat exchanger 17 is a gas heat exchanger disposed indoors and comprises an indoor fan 171, that is, the refrigerant in the third heat exchanger 17 exchanges heat with a gaseous fluid (for example, an airflow produced by the operation of the indoor fan 171). In this and some other embodiments, the first expansion device 14 and the second expansion device 16 are, but not limited to, expansion valves or capillaries.

The four-way valve 11 comprises a first opening 111, a second opening 112, a third opening 113 and a fourth opening 114 In the four-way valve 11, the first opening 111 is selectively connected to the third opening 113 and the fourth opening 114, the first opening 111 is not connected to the second opening 112, the third opening 113 is selectively connected to the first opening 111 and the second opening 112, and the third opening 113 is not connected to the fourth opening 114.

The first opening 111, the compressor 12, the first heat exchanger 13, the first expansion device 14 and the second opening 112 are sequentially connected in series through a refrigerant pipeline. The third opening 113, the second heat exchanger 15, the first three-way pipe 191, the second expansion device 16, the third heat exchanger 17, the second three-way pipe 192 and the fourth opening 114 are also sequentially connected in series through a refrigerant pipeline.

The first bypass valve 18 is connected between the first heat exchanger 13 and the second opening 112, and is connected in parallel with the first expansion device 14. Specifically, one end of the first bypass valve 18 is connected to the first heat exchanger 13, and the other end of the first bypass valve 18 is connected to the second opening 112. In this and some other embodiments, the refrigerant in the first heat exchanger 13 flows through the first expansion device 14 or the first bypass valve 18 to the second opening 112.

The second bypass valve 19 is connected to the first three-way pipe 191 and the second three-way pipe 192. The second bypass valve 19 is connected in parallel with the second expansion device 16 and the third heat exchanger 17. Specifically, one end of the second bypass valve 19 is connected to the refrigerant pipeline located between the second heat exchanger 15 and the second expansion device 16, and the other end of the second bypass valve 19 is connected to the fourth opening 114.

In this and some other embodiments, the liquid supply system 20 further comprises a pump 21, a liquid inlet pipe 24, a liquid outlet pipe 25 and a liquid storage device 23. The pump 21 is, but not limited to, a variable frequency pump or a constant frequency pump. In this and some other embodiments, the liquid storage device 23 is used for storing a liquid, for example, water. The liquid inlet pipe 24 and the liquid outlet pipe 25 are connected to the pump 21, and are both connected to the liquid storage device 23. The liquid outlet pipe 25 penetrates the first heat exchanger 13. The pump 21 drives the liquid to circulate between the first heat exchanger 13 and the liquid storage device 23, so that the liquid exchanges heat with the refrigerant in the first heat exchanger 13.

In this and some other embodiments, the liquid supply system 20 further comprises a three-way valve 22 and an auxiliary liquid outlet pipe 26. The three-way valve 22 is connected to the liquid outlet pipe 25, and is located between the pump 21 and the first heat exchanger 13. One end of the auxiliary liquid outlet pipe 26 is connected to the three-way valve 22, and the other end of the auxiliary liquid outlet pipe 26 is connected to the liquid outlet pipe 25 located between the first heat exchanger 13 and the liquid storage device 23. The three-way valve 22 is used for dividing the fluid flowing from the pump 21 to the first heat exchanger 13, so as to adjust the amount of the fluid flowing into the first heat exchanger 13 for heat exchange.

In this and some other embodiments, the heat pump air-conditioning system 1 of this embodiment further comprises a control device 30. The control device 30 is electrically connected to the four-way valve 11, the compressor 12, the first heat exchanger 13, the second heat exchanger 15, the third heat exchanger 17, the first expansion device 14, the second expansion device 16, the first bypass valve 18, the second bypass valve 19, the pump 21 and the three-way valve 22. The control device 30 is used for controlling the operation of elements in the heat pump air-conditioning system 1.

Control modes of the heat pump air-conditioning system 1 in the disclosure are illustrated below.

Figure 2:
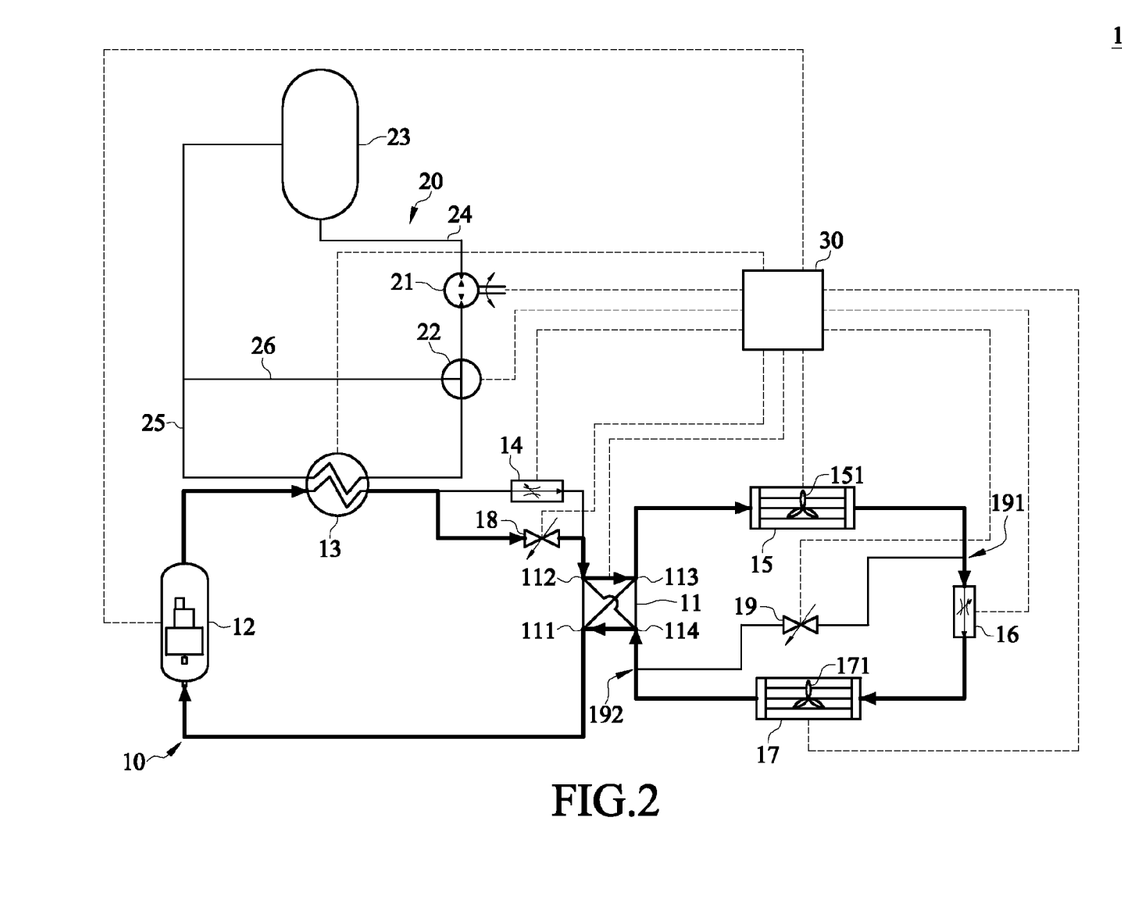
FIG. 2 is a schematic view of a first control mode of the heat pump air-conditioning system in FIG. 1.

FIG. 2 is a schematic view of a first control mode of the heat pump air-conditioning system in FIG. 1. The first control mode of the heat pump air-conditioning system in this embodiment is to provide cool air.

First, in the heat pump air-conditioning system 1, the control device 30 turns off the pump 21 of the liquid supply system 20, the first expansion device 14 and the second bypass valve 19. The control device 30 controls the refrigerant to flow from the compressor 12 sequentially through the first heat exchanger 13, the first bypass valve 18, the second opening 112 and the third opening 113 of the four-way valve 11, the second heat exchanger 15, and the second expansion device 16 to the third heat exchanger 17, and then flow from the third heat exchanger 17 through the fourth opening 114 and the first opening 111 of the four-way valve 11 back to the compressor 12, so as to complete a refrigerant circulation.

Since the pump 21 is turned off, the refrigerant does not carry out heat exchange when flowing through the first heat exchanger 13. When flowing through the second heat exchanger 15, the refrigerant releases heat, and the outdoor fan 151 of the second heat exchanger 15 blows the hot air outdoors. When flowing through the third heat exchanger 17, the refrigerant absorbs heat, and the indoor fan 171 of the third heat exchanger 17 blows the cold air indoors for cooling.

When the heat pump air-conditioning system 1 of this embodiment provides cool air, since the refrigerant does not carry out heat exchange when flowing through the first heat exchanger 13, the refrigerant is gaseous of high temperature and high pressure when flowing out of the first heat exchanger 13. The refrigerant passes through the first bypass valve 18 and does not need to pass through the first expansion device 14 when flowing from the first heat exchanger 13 to the second heat exchanger 15. Therefore, the gaseous refrigerant of high temperature and high pressure does not undergo an unnecessary pressure drop to reduce the system efficiency. In this and some other embodiments, it was acquired through actual experimental measurements that the C.O.P of the heat pump air-conditioning system 1 is 3.62 when providing cool air, and the C.O.P of the heat pump air-conditioning system for providing cool air in a contrast group without the first bypass valve 18 was measured to be only 2.564. Therefore, it can be figured out through the above experiment that the design of the heat pump air-conditioning system 1 of the disclosure actually improves the C.O.P of the system effectively.

Figure 3:
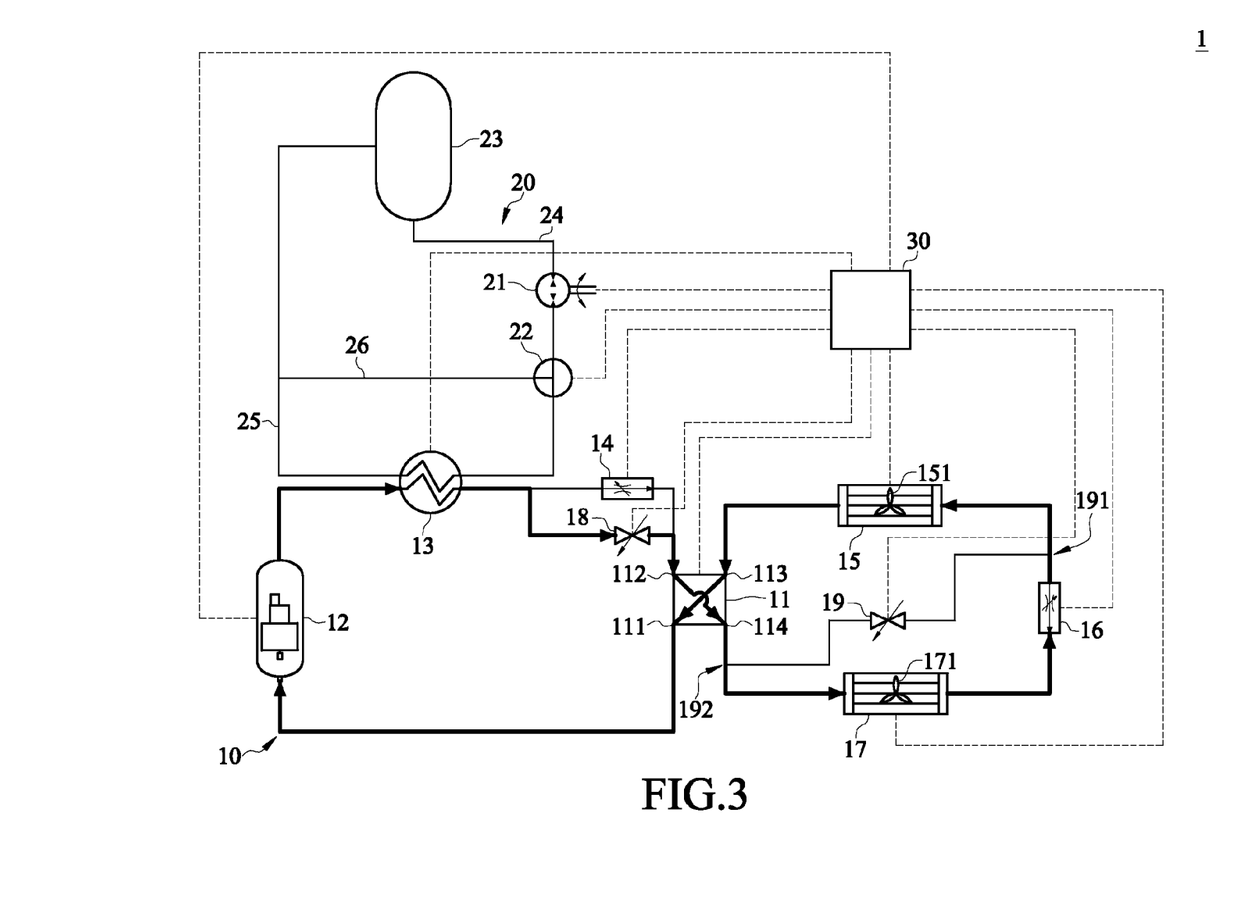
FIG. 3 is a schematic view of a second control mode of the heat pump air-conditioning system in FIG. 1.

FIG. 3 is a schematic view of a second control mode of the heat pump air-conditioning system in FIG. 1. The second control mode of the heat pump air-conditioning system in this embodiment is to provide warm air.

In the heat pump air-conditioning system 1, the control device 30 turns off the pump 21 of the liquid supply system 20, the first expansion device 14 and the second bypass valve 19. The control device 30 controls the refrigerant to flow from the compressor 12 sequentially through the first heat exchanger 13, the first bypass valve 18, the second opening 112 and the fourth opening 114 of the four-way valve 11, the third heat exchanger 17, and the second expansion device 16 to the second heat exchanger 15, and then flow from the second heat exchanger 15 through the third opening 113 and the first opening 111 of the four-way valve 11 back to the compressor 12, so as to complete a refrigerant circulation.

Since the pump 21 is turned off, the refrigerant does not carry out heat exchange when flowing through the first heat exchanger 13. When flowing through the third heat exchanger 17, the refrigerant releases heat, and the indoor fan 171 of the third heat exchanger 17 blows the hot air indoors for warming. When flowing through the second heat exchanger 15, the refrigerant absorbs heat, and the outdoor fan 151 of the second heat exchanger 15 exhausts the cold air outdoors.

When the heat pump air-conditioning system 1 of this embodiment provides warm air, since the refrigerant does not carry out heat exchange when flowing through the first heat exchanger 13, the refrigerant is gaseous of high temperature and high pressure when flowing out of the first heat exchanger 13. The refrigerant passes through the first bypass valve 18 and does not need to pass through the first expansion device 14 when flowing from the first heat exchanger 13 to the third heat exchanger 17. Therefore, the gaseous refrigerant of high temperature and high pressure does not undergo an unnecessary pressure drop to reduce the system efficiency.

Figure 4:
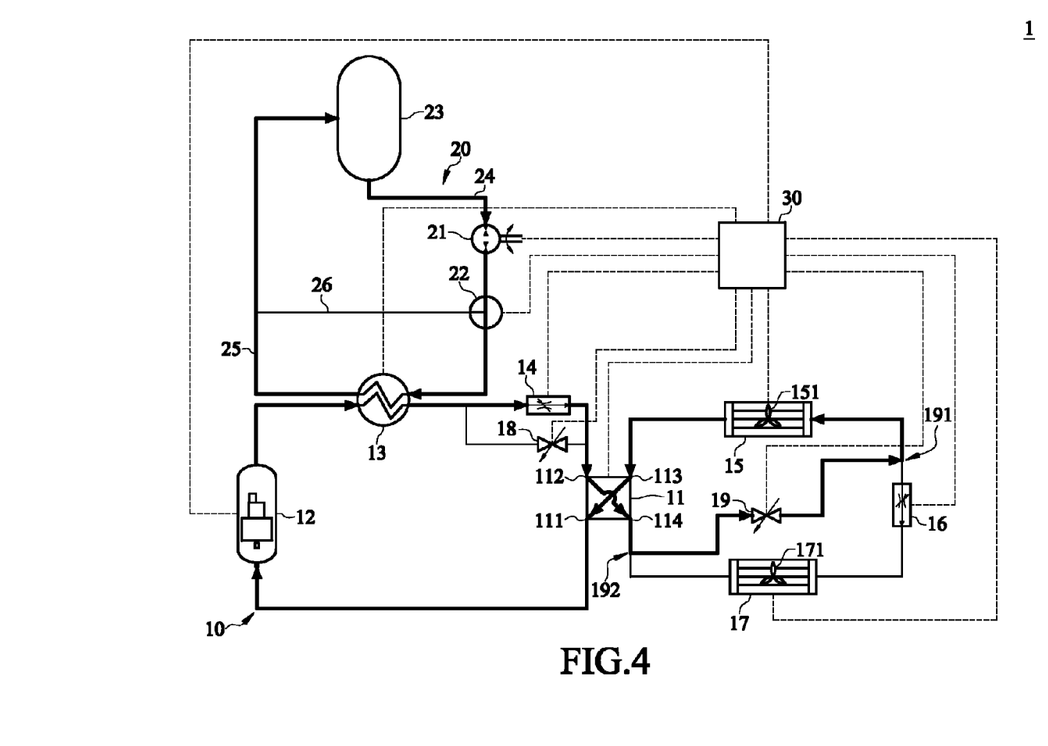
FIG. 4 is a schematic view of a third control mode of the heat pump air-conditioning system in FIG. 1.

FIG. 4 is a schematic view of a third control mode of the heat pump air-conditioning system in FIG. 1. The third control mode of the heat pump air-conditioning system in this embodiment is to function as a heat pump.

In the heat pump air-conditioning system 1, the control device 30 turns off the first bypass valve 18 and the second expansion device 16. The control device 30 controls the refrigerant to flow from the compressor 12 sequentially through the first heat exchanger 13, the first expansion device 14, the second opening 112 and the fourth opening 114 of the four-way valve 11, and the second bypass valve 19 to the second heat exchanger 15, and then flow from the second heat exchanger 15 through the third opening 113 and the first opening 111 of the four-way valve 11 back to the compressor 12, so as to complete a refrigerant circulation.

The pump 21 drives the liquid (for example, water) in the liquid supply system 20 to flow through the first heat exchanger 13 to absorb the heat of the refrigerant and store the heat in the liquid storage device 23, so as to raise the temperature of the liquid in the liquid storage device 23. Therefore, the temperature of the liquid rises and the liquid storage device 23 is able to provide hot liquid (for example, hot water). When flowing through the second heat exchanger 15, the refrigerant absorbs heat, and the outdoor fan 151 of the second heat exchanger 15 blows the cold air outdoors.

When the heat pump air-conditioning system 1 of this embodiment functions as a heat pump, since the refrigerant passes through the second bypass valve 19 and does not need to pass through the second expansion device 16 when flowing from the first expansion device 14 to the second heat exchanger 15, the refrigerant does not undergo an unnecessary pressure drop which reduces the system efficiency. In this and some other embodiments, it is acquired through actual experimental measurements that the C.O.P of the heat pump air-conditioning system 1 was 4.18 when functioning as a heat pump, and the C.O.P of the heat pump air-conditioning system functioning as a heat pump in a contrast group without the second bypass valve 19 was measured to be only 2.8. Therefore, it can be figured out through the above experiment that the design of the heat pump air-conditioning system 1 of the disclosure actually improves the C.O.P of the system effectively.

Figure 5:
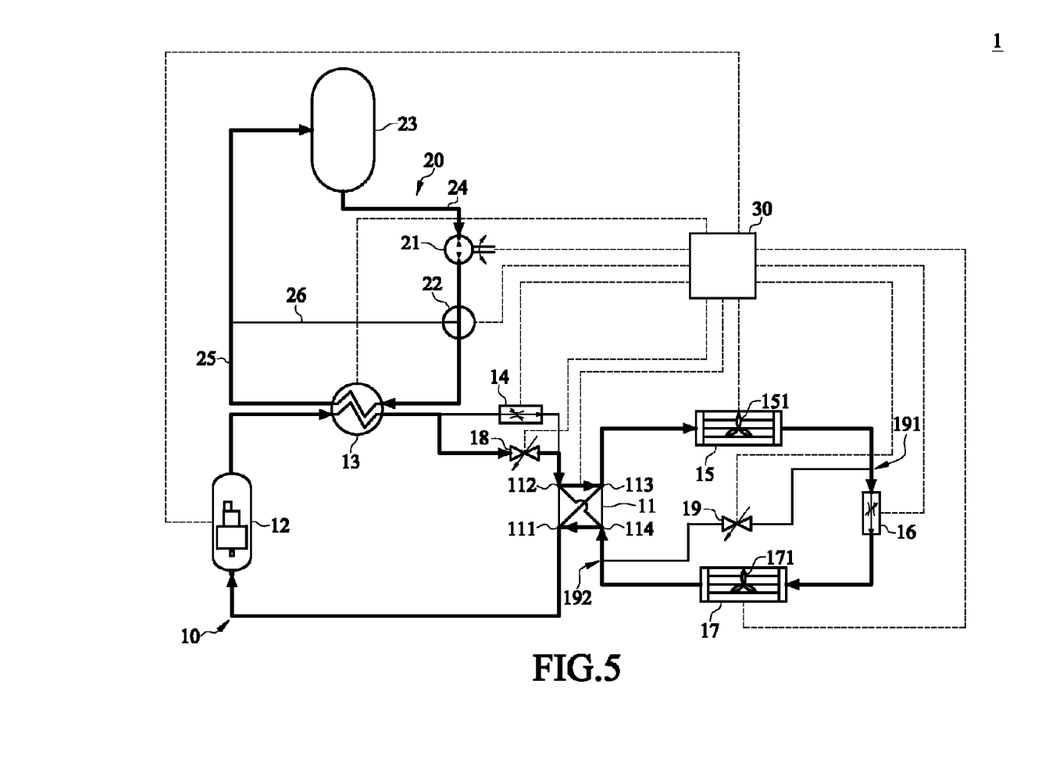
FIG. 5 is a schematic view of a fourth control mode of the heat pump air-conditioning system in FIG. 1.

FIG. 5 is a schematic view of a fourth control mode of the heat pump air-conditioning system in FIG. 1. The fourth control mode of the heat pump air-conditioning system in this embodiment is a composite mode both functioning as a heat pump and providing cool air.

In the heat pump air-conditioning system 1, the control device 30 turns off the first expansion device 14 and the second bypass valve 19. The control device 30 controls the refrigerant to flow from the compressor 12 sequentially through the first heat exchanger 13, the first bypass valve 18, the second opening 112 and the third opening 113 of the four-way valve 11, the second heat exchanger 15, and the second expansion device 16 to the third heat exchanger 17, and then flow from the third heat exchanger 17 through the fourth opening 114 and the first opening 111 of the four-way valve 11 back to the compressor 12, so as to complete a refrigerant circulation.

The pump 21 drives the liquid (for example, water) in the liquid supply system 20 to flow through the first heat exchanger 13 to absorb the heat of the refrigerant and store the heat in the liquid storage device 23, so as to raise the temperature of the liquid in the liquid storage device 23. Therefore, the temperature of the liquid rises and the liquid storage device 23 is able to provide hot liquid (for example, hot water). When flowing through the second heat exchanger 15, the refrigerant releases heat, and the outdoor fan 151 of the second heat exchanger 15 blows the hot air outdoors. When flowing through the third heat exchanger 17, the refrigerant absorbs heat, and the indoor fan 171 of the third heat exchanger 17 blows the cold air indoors for cooling.

Figure 6:
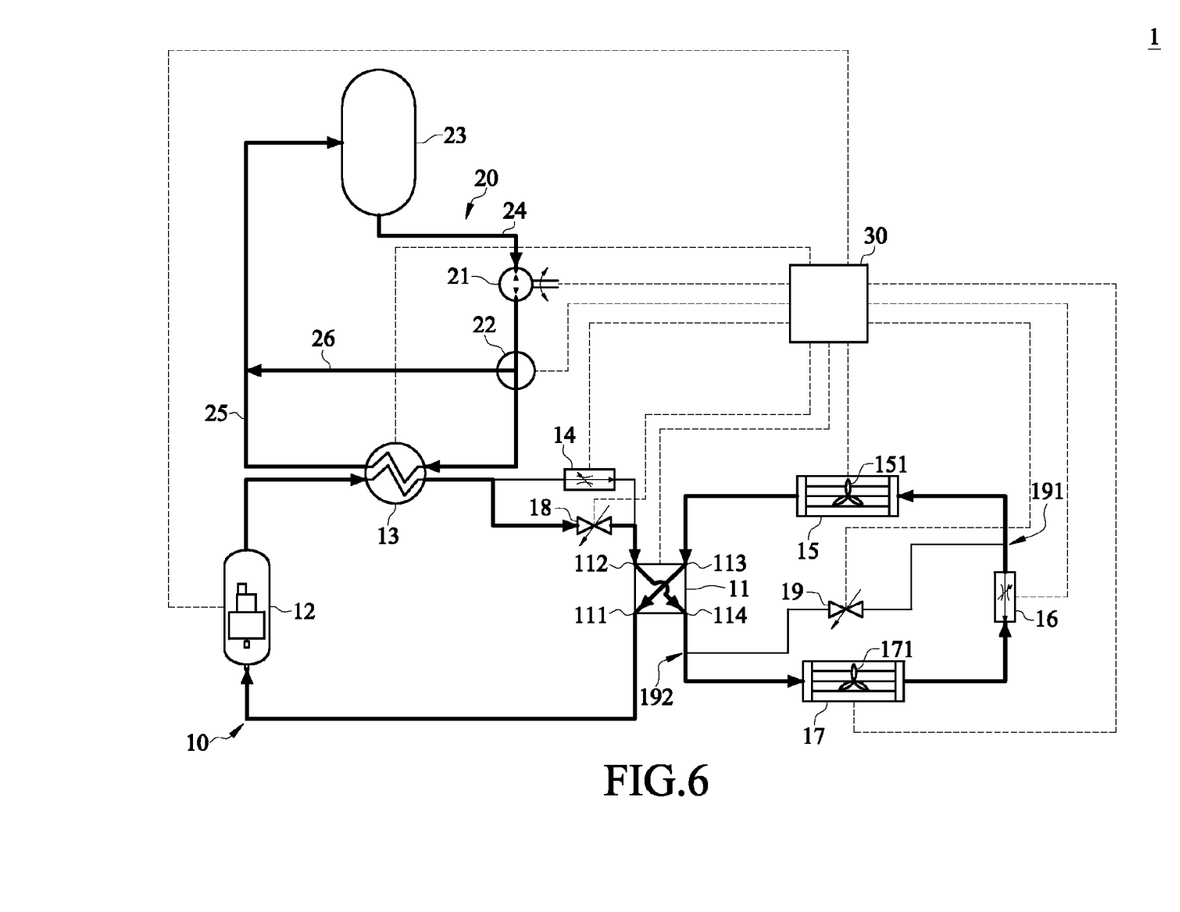
FIG. 6 is a schematic view of a fifth control mode of the heat pump air-conditioning system in FIG. 1.

FIG. 6 is a schematic view of a fifth control mode of the heat pump air-conditioning system in FIG. 1. The fifth control mode of the heat pump air-conditioning system in this embodiment is a composite mode both functioning as a heat pump and providing warm air.

In the heat pump air-conditioning system 1, the control device 30 turns off the first expansion device 14 and the second bypass valve 19. The control device 30 controls the refrigerant to flow from the compressor 12 sequentially through the first heat exchanger 13, the first bypass valve 18, the second opening 112 and the fourth opening 114 of the four-way valve 11, the third heat exchanger 17, and the second expansion device 16 to the second heat exchanger 15, and then flow from the second heat exchanger 15 through the third opening 113 and the first opening 111 of the four-way valve 11 back to the compressor 12, so as to complete a refrigerant circulation.

The pump 21 drives the liquid (for example, water) in the liquid supply system 20 to flow through the first heat exchanger 13 to absorb the heat of the refrigerant and store the heat in the liquid storage device 23, so as to raise the temperature of the liquid in the liquid storage device 23. Therefore, the temperature of the liquid rises and the liquid storage device 23 is able to provide hot liquid (for example, hot water). When flowing through the third heat exchanger 17, the refrigerant releases heat, and the indoor fan 171 of the third heat exchanger 17 blows the hot air indoors for warming. When flowing through the second heat exchanger 15, the refrigerant absorbs heat, and the outdoor fan 151 of the second heat exchanger 15 exhausts the cold air outdoors.

Since the heat pump air-conditioning system 1 of this embodiment functions as both a heat pump and a warm air provider, to ensure good effect of warming, in this and some other embodiments, the three-way valve 22 is used for adjusting the heat of the refrigerant absorbed by the liquid supply system 20 from the first heat exchanger 13. Specifically, in this and some other embodiments, if the control device 30 senses that the temperature or the amount of the liquid in the liquid supply system 20 flowing through the first heat exchanger 13 is excessively high, the control device 30 drives the three-way valve 22, so that a part of the liquid flows back to the liquid storage device 23 through the auxiliary liquid outlet pipe 26, and another part of the liquid flows to the first heat exchanger 13. Therefore, the temperature and the amount of the liquid are under control, and the proportions of the heat required for the operation of the heat pump and for warming are set.

Figure 7:
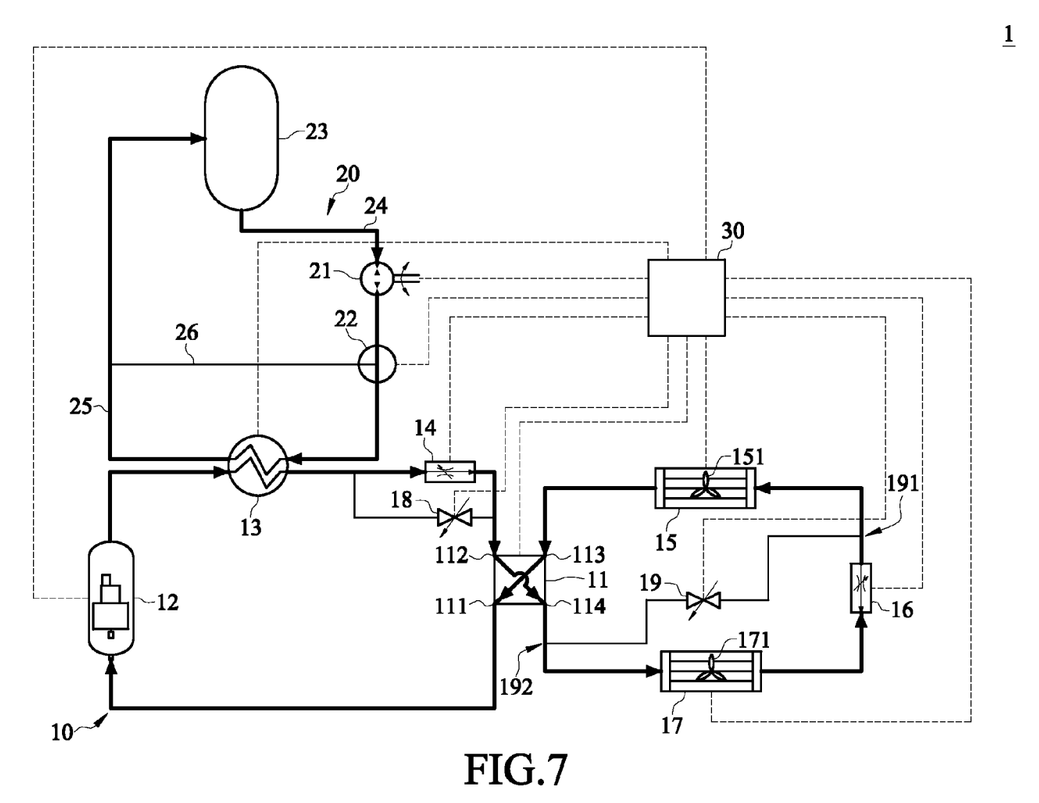
FIG. 7 is a schematic view of a sixth control mode of the heat pump air-conditioning system in FIG. 1.

FIG. 7 is a schematic view of a sixth control mode of the heat pump air-conditioning system in FIG. 1. The sixth control mode of the heat pump air-conditioning system in this embodiment is a composite mode both functioning as a heat pump and sharing the load for providing cool air.

In the heat pump air-conditioning system 1, the control device 30 turns off the first bypass valve 18 and the second bypass valve 19. The control device 30 controls the refrigerant to flow from the compressor 12 sequentially through the first heat exchanger 13, the first expansion device 14, the second opening 112 and the fourth opening 114 of the four-way valve 11, the third heat exchanger 17, and the second expansion device 16 to the second heat exchanger 15, and then flow from the second heat exchanger 15 through the third opening 113 and the first opening 111 of the four-way valve 11 back to the compressor 12, so as to complete a refrigerant circulation.

The pump 21 drives the liquid (for example, water) in the liquid supply system 20 to flow through the first heat exchanger 13 to absorb the heat of the refrigerant and store the heat in the liquid storage device 23, so as to raise the temperature of the liquid in the liquid storage device 23. Therefore, the temperature of the liquid rises and the liquid storage device 23 is able to provide hot liquid (for example, hot water). When the demand of the cool air is not high but a large amount of the hot liquid needs to be continuously provided, in this and some other embodiments, the refrigerant absorbs heat at the third heat exchanger 17 and the second heat exchanger 15 stage by stage to meet the above requirement. Specifically, when flowing from the first expansion device 14 to the third heat exchanger 17, the refrigerant undergoes a pressure drop and absorbs heat during the heat exchange in the third heat exchanger 17, so that the indoor fan 171 in the third heat exchanger 17 blows the cold air indoors to satisfying the load for indoor cooling. When flowing from the second expansion device 16 to the second heat exchanger 15, the refrigerant again undergoes a pressure drop and absorbs heat during the heat exchange in the second heat exchanger 15 which is located, for example, outdoors, so as to absorb the rest of heat, which is needed to transform the refrigerant back to gaseous state and to meet the demand of the liquid supply system 20 for the heat.

According to the heat pump air-conditioning system and the method for controlling the same provided by the disclosure, the first bypass valve is connected in parallel with the first expansion device and is connected between the first heat exchanger and the second opening, and the second bypass valve is connected in parallel with the second expansion device and the third heat exchanger and is connected between the third heat exchanger and the fourth opening. Therefore, when the heat pump air-conditioning system operates in various modes by adjusting the flow direction of the refrigerant, the refrigerant may not undergo an unnecessary pressure drop, and the overall system efficiency of the heat pump air-conditioning system is improved.

What is claimed is:

1. A heat pump air-conditioning system, comprising:
    a refrigerant circulation system, comprising a four-way valve, a compressor, a first heat exchanger, a second heat exchanger, a third heat exchanger, a first expansion device, a second expansion device, a first three-way pipe and a second three-way pipe, the four-way valve comprising a first opening, a second opening, a third opening and a fourth opening,
    the first opening, the compressor, the first heat exchanger, the first expansion device and the second opening being sequentially connected in series,
    and the third opening, the second heat exchanger, the first three-way pipe, the second expansion device, the third heat exchanger, the second three-way pipe and the fourth opening being sequentially connected in series,
    wherein in the four-way valve, the first opening is directly connectable to the third opening or the fourth opening, the first opening is indirectly connected to the second opening, the second opening is directly connectable to the third opening or the fourth opening, the third opening is indirectly connected to the fourth opening, the second opening is directly connected to the fourth opening when the first opening is directly connected to the third opening, and the second opening is directly connected to the third opening when the first opening is directly connected to the fourth opening;
    a first bypass valve, connected in parallel with the first expansion device, wherein two opposite ends thereof are directly connected to the first heat exchanger and directly connected to the second opening respectively;
    a second bypass valve, connected to the first three-way pipe and the second three-way pipe, the second bypass valve connected in parallel with the second expansion device and the third heat exchanger; and
    a liquid supply system, connected to the first heat exchanger.

2. The heat pump air-conditioning system according to claim 1, wherein the liquid supply system further comprises a pump and a liquid inlet pipe and a liquid outlet pipe connected to the pump, the liquid outlet pipe penetrating the first heat exchanger.

3. The heat pump air-conditioning system according to claim 2, wherein the liquid supply system further comprises a liquid storage device, the liquid inlet pipe and the liquid outlet pipe being respectively connected to the liquid storage device.

4. The heat pump air-conditioning system according to claim 3, wherein the liquid supply system further comprises a three-way valve and an auxiliary liquid outlet pipe, the three-way valve being connected to the liquid outlet pipe and located between the pump and the first heat exchanger, one end of the auxiliary liquid outlet pipe being connected to the three-way valve, and the other end of the auxiliary liquid outlet pipe being connected to the liquid outlet pipe located between the first heat exchanger and the liquid storage device.

5. The heat pump air-conditioning system according to claim 4, further comprising a control device, electrically connected to the four-way valve, the compressor, the first heat exchanger, the second heat exchanger, the third heat exchanger, the first expansion device, the second expansion device, the first bypass valve, the second bypass valve, the pump and the three-way valve.

6. The heat pump air-conditioning system according to claim 1, wherein the second heat exchanger comprises an outdoor fan, and the third heat exchanger comprises an indoor fan.

7. The heat pump air-conditioning system according to claim 1, wherein the liquid supply system further comprises a pump, a liquid storage device, a liquid inlet pipe and a liquid outlet pipe, the liquid inlet pipe and the liquid outlet pipe being both connected to the pump and the liquid storage device, and the liquid outlet pipe penetrating the first heat exchanger.

8. A method for controlling a heat pump air-conditioning system, comprising:
    providing the heat pump air-conditioning system according to claim 1;
    turning off the liquid supply system, the first expansion device and the second bypass valve; and
    enabling the refrigerant to flow from the compressor sequentially through the first heat exchanger, the first bypass valve, the four-way valve, the second heat exchanger, and the second expansion device to the third heat exchanger, and then flow from the third heat exchanger through the four-way valve back to the compressor, the refrigerant releasing heat at the second heat exchanger and absorbing heat at the third heat exchanger.

9. The method for controlling the heat pump air-conditioning system according to claim 8, wherein the second heat exchanger comprises an outdoor fan, and the third heat exchanger comprises an indoor fan.

10. A method for controlling a heat pump air-conditioning system, comprising:
    providing the heat pump air-conditioning system according to claim 1;
    turning off the liquid supply system, the first expansion device and the second bypass valve; and
    enabling the refrigerant to flow from the compressor sequentially through the first heat exchanger, the first bypass valve, the four-way valve, the third heat exchanger, and the second expansion device to the second heat exchanger, and then flow from the second heat exchanger through the four-way valve back to the compressor, the refrigerant absorbing heat at the second heat exchanger and releasing heat at the third heat exchanger.

11. The method for controlling the heat pump air-conditioning system according to claim 10, wherein the second heat exchanger comprises an outdoor fan, and the third heat exchanger comprises an indoor fan.

12. A method for controlling a heat pump air-conditioning system, comprising:
    providing the heat pump air-conditioning system according to claim 1;
    turning off the first bypass valve and the second expansion device; and
    enabling the refrigerant to flow from the compressor sequentially through the first heat exchanger, the first expansion device, the four-way valve, and the second bypass valve to the second heat exchanger, and then flow from the second heat exchanger through the four-way valve back to the compressor, the liquid supply system absorbing heat of the refrigerant from the first heat exchanger, and the refrigerant absorbing heat at the second heat exchanger.

13. The method for controlling the heat pump air-conditioning system according to claim 12, wherein the liquid supply system further comprises a pump, a liquid storage device, a liquid inlet pipe and a liquid outlet pipe, the liquid inlet pipe and the liquid outlet pipe being both connected to the pump and the liquid storage device, the liquid outlet pipe penetrating the first heat exchanger, and the pump operating to enable a liquid in the liquid storage device to flow through the first heat exchanger to absorb the heat of the refrigerant.

14. The method for controlling the heat pump air-conditioning system according to claim 13, wherein the second heat exchanger comprises an outdoor fan, and the third heat exchanger comprises an indoor fan.

15. A method for controlling a heat pump air-conditioning system, comprising:
    providing the heat pump air-conditioning system according to claim 1;
    turning off the first expansion device and the second bypass valve; and
    enabling the refrigerant to flow from the compressor sequentially through the first heat exchanger, the first bypass valve, the four-way valve, the second heat exchanger, and the second expansion device to the third heat exchanger, and then flow from the third heat exchanger through the four-way valve back to the compressor, the liquid supply system absorbing heat of the refrigerant from the first heat exchanger, and the refrigerant releasing heat at the second heat exchanger and absorbing heat at the third heat exchanger.

16. The method for controlling the heat pump air-conditioning system according to claim 15, wherein the liquid supply system further comprises a pump, a liquid storage device, a liquid inlet pipe and a liquid outlet pipe, the liquid inlet pipe and the liquid outlet pipe being both connected to the pump and the liquid storage device, the liquid outlet pipe penetrating the first heat exchanger, and the pump operating to enable a liquid in the liquid storage device to flow through the first heat exchanger to absorb the heat of the refrigerant.

17. The method for controlling the heat pump air-conditioning system according to claim 15, wherein the second heat exchanger comprises an outdoor fan, and the third heat exchanger comprises an indoor fan.

18. A method for controlling a heat pump air-conditioning system, comprising:
    providing the heat pump air-conditioning system according to claim 1;
    turning off the first expansion device and the second bypass valve; and
    enabling the refrigerant to flow from the compressor sequentially through the first heat exchanger, the first bypass valve, the four-way valve, the third heat exchanger, and the second expansion device to the second heat exchanger, and then flow from the second heat exchanger through the four-way valve back to the compressor, the liquid supply system absorbing heat of the refrigerant from the first heat exchanger, and the refrigerant absorbing heat at the second heat exchanger and releasing heat at the third heat exchanger.

19. The method for controlling the heat pump air-conditioning system according to claim 18, further comprising: using a three-way valve to control the amount of a fluid flowing from the liquid supply system through the first heat exchanger, so as to adjust the heat of the refrigerant absorbed by the liquid supply system from the first heat exchanger.

20. The method for controlling the heat pump air-conditioning system according to claim 18, wherein the liquid supply system further comprises a pump, a liquid storage device, a liquid inlet pipe and a liquid outlet pipe, the liquid inlet pipe and the liquid outlet pipe being both connected to the pump and the liquid storage device, the liquid outlet pipe penetrating the first heat exchanger, and the pump operating to enable a liquid in the liquid storage device to flow through the first heat exchanger to absorb the heat of the refrigerant.

21. The method for controlling the heat pump air-conditioning system according to claim 18, wherein the second heat exchanger comprises an outdoor fan, and the third heat exchanger comprises an indoor fan.

22. A method for controlling a heat pump air-conditioning system, comprising:
    providing the heat pump air-conditioning system according to claim 1;
    turning off the first bypass valve and the second bypass valve; and
    enabling the refrigerant to flow from the compressor sequentially through the first heat exchanger, the first expansion device, the four-way valve, the third heat exchanger, and the second expansion device to the second heat exchanger, and then flow from the second heat exchanger through the four-way valve back to the compressor, the liquid supply system absorbing heat of the refrigerant from the first heat exchanger, and the refrigerant absorbing heat at the second heat exchanger and the third heat exchanger.

23. The method for controlling the heat pump air-conditioning system according to claim 22, wherein the liquid supply system further comprises a pump, a liquid storage device, a liquid inlet pipe and a liquid outlet pipe, the liquid inlet pipe and the liquid outlet pipe being both connected to the pump and the liquid storage device, the liquid outlet pipe penetrating the first heat exchanger, and the pump operating to enable a liquid in the liquid storage device to flow through the first heat exchanger to absorb the heat of the refrigerant.

24. The method for controlling the heat pump air-conditioning system according to claim 22, wherein the second heat exchanger comprises an outdoor fan, and the third heat exchanger comprises an indoor fan.

* * * * *